Patented May 22, 1934

1,960,205

UNITED STATES PATENT OFFICE 1,960,205

PROCESS OF PREPARING THIAZOLES

Raymond F. Dunbrook, Akron, Ohio, assignor to The Firestone Tire & Rubber Company, Akron, Ohio, a corporation of Ohio No Drawing. Application August 25, 1930, Serial No. 477,797

18 Claims. (Cl. 260—44)

This invention relates to the preparation of mercapto-thiazoles.

The general object of the invention resides in the provision of a relatively inexpensive, rapid, one-reaction process for commercially preparing mercapto-thiazoles.

A more specific object of the invention is the preparation of mercapto-thiazoles suitable for use as accelerators in the vulcanization of rubber.

It is an object of the invention to develop a process utilizing inexpensive raw materials, which are treated in simple apparatus to give a maximum yield.

A further object of the invention resides in the provision of a one-step process resulting in a mixed product which will serve to supply the sulphur content to the rubber batch and also as an accelerator.

The above and other objects of the invention are achieved by the process described below, it being understood that the invention is not limited to the exact details set forth merely by way of example.

To illustrate the invention the preparation of 2-mercapto-benzo-thiazole is characteristic and will be described.

Ortho-nitro-chlor-benzene is preferably used as a starting agent as it is comparatively cheap, gives no undesirable by-products, and is reactive at ordinary pressures, thus avoiding the use of expensive autoclave apparatus. This material is subjected to a single reaction with sodium polysulphide in the presence of carbon bisulphide resulting in a mixture of 2-mercapto-benzo-thiazole and sulphur which may be precipitated and used directly in a rubber mix as both a vulcanizing and an accelerating agent, or if desired may be further separated to produce a pure 2-mercapto-benzo-thiazole.

The sodium polysulphide solution used may be made by mixing 200 parts of crystallized sodium sulphide, $Na_2S \cdot 9H_2O$, 75 parts sulphur and 200 parts of water and heating the solution until all the sulphur is dissolved. The polysulphide formed contains from 2 to 5 atoms of sulphur, the amount being denoted as $x$ in the equation below. The resulting sodium polysulphide solution is placed in a suitable container with 50 parts ortho-nitro-chlor benzene, and 50 parts of carbon bisulphide. The container is preferably provided with an efficient agitator and a suitable reflux condenser.

The complete mixture is refluxed from 4 to 20 hours, preferably about 8 hours, at a temperature between 50° and 100° C., preferably about 90° C. At the end of this time steam is passed into the mixture to remove any volatile products. The resulting mixture is then filtered to remove suspended sulphur after which the filtrate is acidified with dilute hydrochloric acid to precipitate a mixture of sulphur and 2-mercapto-benzo-thiazole which is in turn filtered and thoroughly washed.

If it is desired to further purify and separate the sulphur, the filter cake is then suspended in water and a dilute sodium hydroxide solution is added to dissolve the 2-mercapto-benzo-thiazole as the sodium salt so that the sulphur, which remains in suspension, can be removed by filtration. The filtrate containing the sodium salt of the thiazole is then cooled and dilute hydrochloric acid is added thus precipitating the 2-mercapto-benzo-thiazole which is filtered off, washed and dried. The yields obtained by the above process are about 95% of the theoretical.

The principal mechanism for the above reaction is probably as follows:

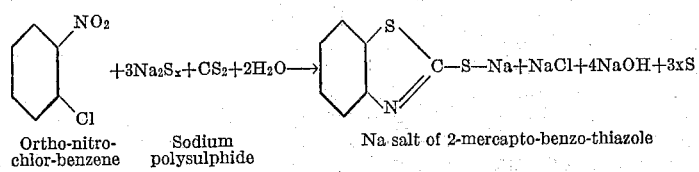

Ortho-nitro-chlor-benzene    Sodium polysulphide      Na salt of 2-mercapto-benzo-thiazole The accelerating value of the 2-mercapto-benzo-thiazole obtained by the above process is, within experimental error, the same as that obtained from commercial 2-mercapto-benzo-thiazole.

It has been found by experiment that while better yields are obtained by constant stirring during the refluxing action that this is not an absolute requisite in the process and that yields as high as 85% may be obtained without stirring.

While either crystallized sodium sulphide or commercial fused sodium sulphide can be used to prepare the sodium polysulphide employed in the reaction the latter is preferably used in commercial practice to reduce costs.

The exact proportions of the various compounds entering into the above reaction can, of course, be widely varied. This is particularly true in regard to the time and temperature of the refluxing, the concentration of the solutions, the ratio of sulphur to sodium sulphide and the ratio of sodium polysulphide to ortho-nitro-chlor-benzene. It is found, however, that the best yields are obtained by using sodium polysulphide of the composition $Na_2S_4$ in the ratio of 1.5 to 3.5 moles, preferably about 2.6 moles to one mole of ortho-nitro-chlor-benzene.

A particularly important phase of the invention is that the crude reaction product of the process can be used to supply a portion of the sulphur content to the rubber batch as well as acting as an accelerator. To obtain the crude reaction product the purification steps described above are stopped after the filtrate has been acidified to precipitate a mixture of sulphur and 2-mercapto-benzo-thiazole which is filtered out, washed and dried. This mixture of sulphur and 2-mercapto-benzo-thiazole can be mixed in the rubber batch and will serve in the above recited manner. The ratio between the sulphur and the 2-mercapto-benzo-thiazole, ordinarily about 50:50, must be substantially constant so that the rubber batch can be correctly compounded. If the sulphur mixed with the 2-mercapto-benzo-thiazole is not sufficient to bring the sulphur content up to that necessary for vulcanization, sulphur is added to the rubber batch in the usual manner.

This method saves the further treating of the reaction product thus lowering production costs.

As a modification of the above process 2-mercapto-benzo-thiazole can be obtained by the reaction of ortho-nitro-chlor-benzene with sodium sulphide and carbon bisulphide. The following proportions are illustrative: 50 parts ortho-nitro-chlor-benzene, 50 parts carbon bisulphide, 250 parts crystallized sodium sulphide, 200 parts water. The steps are similar to those given in the above process, a theoretical yield of approximately 60% resulting. By this method, however, considerable ortho-chloraniline is produced as a by-product which is undesirable.

It is stated above that ortho-nitro-chlor-benzene is preferably used as a starting agent on account of its cheapness. It will be understood, however, that analogous compounds having a nitro and a halogen radical attached to adjacent carbon atoms may be used with similar results. Thus the halogen may be bromine or iodine instead of chlorine; also dinitro-chlor-benzene has been found to react similarly to ortho-nitro-chlor-benzene. Furthermore, other aryl radicals may be substituted for the phenyl radical in 2-mercapto-benzo-thiazole, such as the tolyl and xylyl and the resulting mercapto-thiazoles which are produced may be used with substantially the same effectiveness.

As many variations and applications of the above processes can be resorted to by those skilled in the art, it is intended that all matter contained in the above description shall be interpreted as illustrative only and not in a limiting sense. Accordingly, various modifications of the invention can be resorted to without departing from the spirit of the invention or the scope of the appended claims.

What is claimed is:

1. The method of making 2-mercapto-benzo-thiazole which consists in mixing ortho-nitro-chlor-benzene with sodium polysulphide in the presence of carbon bisulphide, refluxing the resulting mixture at a temperature of 50° C. to 100° C., and purifying the resulting product.

2. The method of making 2-mercapto-benzo-thiazole which consists in mixing ortho-nitro-chlor-benzene with sodium polysulphide in the presence of carbon bisulphide refluxing the resulting mixture, and purifying the resulting product.

3. The method of making 2-mercapto-benzo-thiazole which consists in mixing ortho-nitro-chlor-benzene with sodium polysulphide in the presence of carbon bisulphide, and refluxing the resulting mixture at a temperature of 50° C. to 100° C.

4. The method of making 2-mercapto-benzo-thiazole which consists in heating ortho-nitro-chlor-benzene with sodium polysulphide in the presence of carbon bisulphide.

5. The method of making 2-mercapto-benzo-thiazole which consists in heating ortho-nitro-chlor-benzene with a sulphide of sodium in the presence of carbon bisulphide.

6. The method of preparing a mercapto-benzo-thiazole which comprises heating a member of the benzene series, having a nitro and a halogen radical attached to adjacent carbon atoms, with sodium polysulphide in the presence of carbon bisulphide.

7. The method of preparing a mercapto-benzo-thiazole which comprises mixing a member of the benzene series, having a nitro and a halogen radical attached to adjacent carbon atoms, with sodium polysulphide in the presence of carbon bisulphide, refluxing the mixture, and purifying the resulting product.

8. The method of preparing a mercapto-benzo-thiazole which comprises mixing a member of the benzene series, having a nitro and a halogen radical attached to adjacent carbon atoms, with sodium polysulphide in the presence of carbon bisulphide, and refluxing the mixture.

9. The method of preparing a mercapto-benzo-thiazole which comprises heating a member of the benzene series, having a nitro and a halogen radical attached to adjacent carbon atoms, with a sulphide of sodium in the presence of carbon bisulphide.

10. The method of preparing a mercapto-benzo-thiazole which comprises heating a member of the benzene series, having a nitro and a halogen radical attached to adjacent carbon atoms, with a basic sulphide in the presence of carbon bisulphide.

11. The method of making 2-mercapto-benzo-thiazole which consists in heating ortho-nitro-chlor-benzene with a sulphide of sodium in the presence of carbon bisulphide, and agitating the mixture during the treatment.

12. The method of preparing a mercapto-benzo-thiazole which comprises heating a member of the benzene series, having a nitro and a halogen radical attached to adjacent carbon atoms, with sodium polysulphide in the presence of carbon bisulphide.

13. That method of preparing 2-mercapto-benzo-thiazole which comprises causing ortho-nitro-chlor-benzene to react with sodium polysulphide and carbon bisulphide at a temperature from 50° C. to 100° C. for 4 to 20 hours.

14. That method of making a mercapto-benzo-thiazole which consists in heating under reflux a corresponding ortho-nitro-benzo-halide with a solution of sodium polysulphide in the presence of carbon bisulphide.

15. That method of making a mercapto-benzo-thiazole which consists in heating under reflux a corresponding ortho-nitro-benzo-halide with a solution of a sulphide of sodium in the presence of carbon bisulphide.

16. That method of making a mercapto-benzo-thiazole which consists in heating under reflux a corresponding ortho-nitro-benzo-halide with a solution of a basic sulphide in the presence of carbon bisulphide.

17. The method which consists in heating ortho-nitro-chlor-benzene with sodium polysulphide in the presence of carbon bisulphide, removing any volatile products from the mixture, filtering the mixture and acidifying the filtrate to precipitate a mixture of free sulphur and 2-mercapto-benzo-thiazole, and removing, washing, and drying the precipitate.

18. The method which consists in heating ortho-nitro-chlor-benzene with sodium polysulphide in the presence of carbon bisulphide, and filtering the mixture and acidifying the filtrate to precipitate a mixture of free sulphur and 2-mercapto-benzo-thiazole.

RAYMOND F. DUNBROOK.